May 31, 1960 R. H. MILNE 2,938,249
WEATHER STRIP ASSEMBLY
Filed Nov. 5, 1956 2 Sheets-Sheet 1
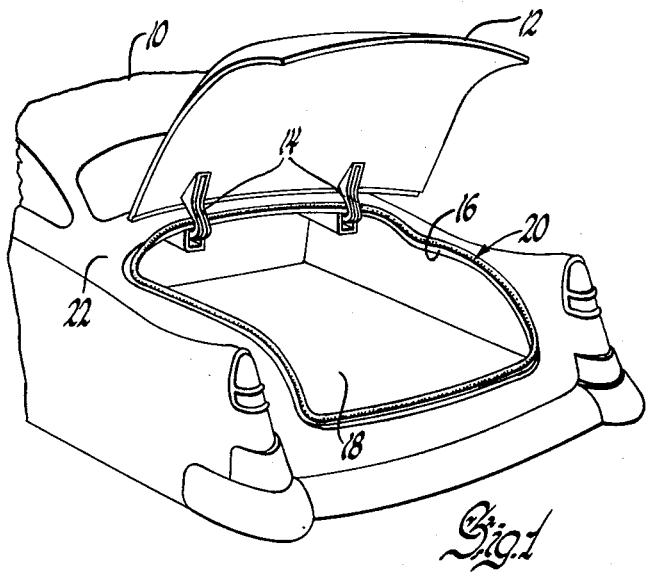
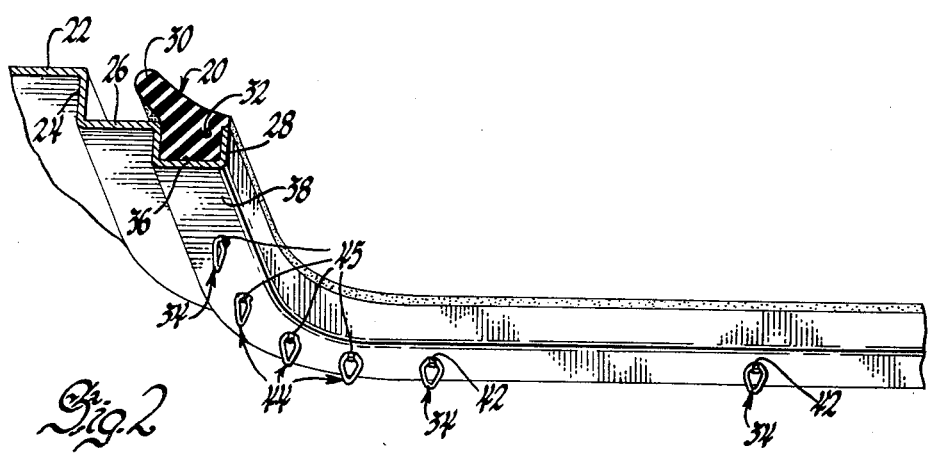
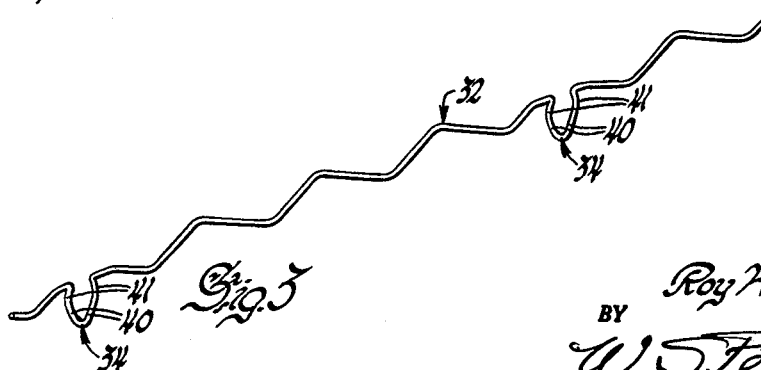
INVENTOR.
Roy H. Milne
BY
W. S. Pettigrew
ATTORNEY May 31, 1960
R. H. MILNE
2,938,249
WEATHER STRIP ASSEMBLY
Filed Nov. 5, 1956
2 Sheets-Sheet 2
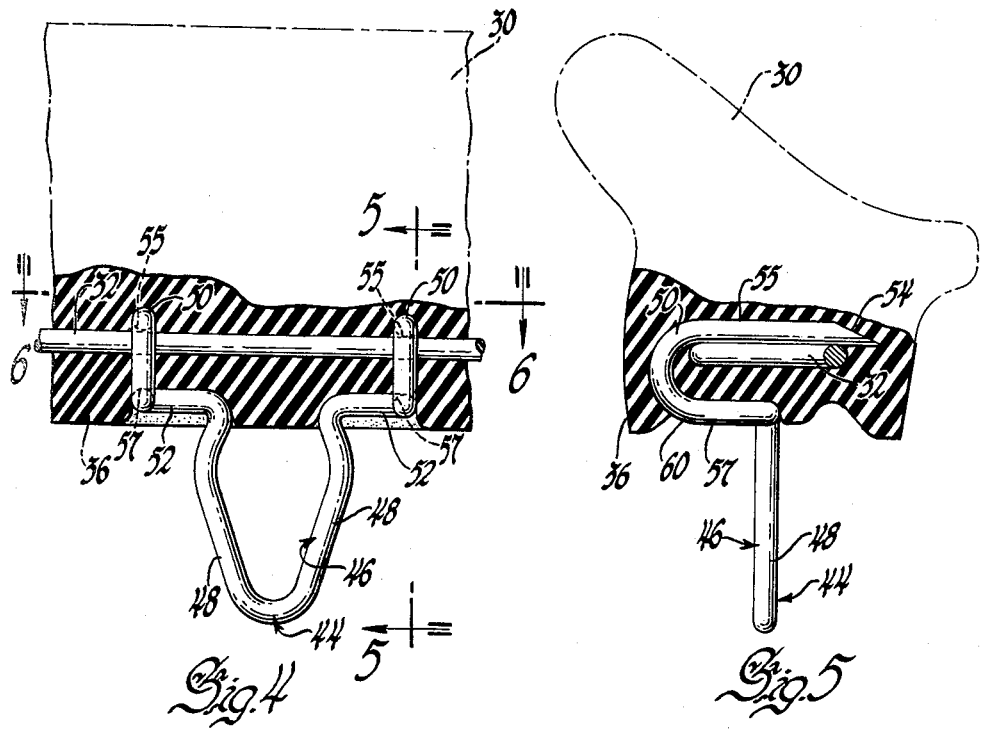
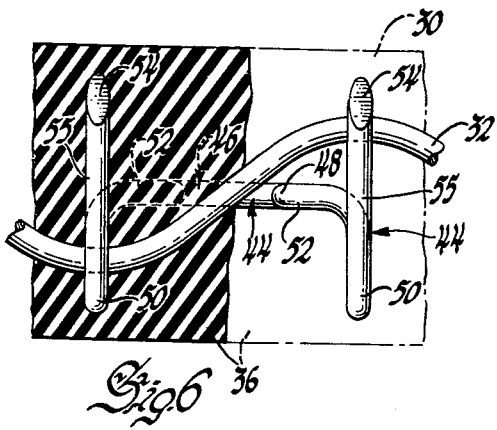
INVENTOR.
Roy H. Milne
BY
W. S. Pettigrew
ATTORNEY United States Patent Office 2,938,249
Patented May 31, 1960

2,938,249

WEATHER STRIP ASSEMBLY

Roy H. Milne, Royal Oak, Mich., assignor to General Motors Corporation, Detroit, Mich., a corporation of Delaware Filed Nov. 5, 1956, Ser. No. 620,273

1 Claim. (Cl. 20—69)

This invention relates to a weather strip assembly and more particularly to a weather strip assembly for sealing closure members of vehicle bodies or the like.

In many current production vehicles, the closure members are sealed by a weather strip assembly which includes a molded elongate sealing strip of resilient compressible material provided with an embedded wire reinforcing member having equally spaced integral attaching means projecting outwardly of one elongate side of the strip to mount the sealing strip on the supporting body member of closure member. The attaching means usually comprise clips having closed or open loops which project through equally spaced openings in the supporting body member or closure member to securely and firmly mount the sealing strip on the supporting member. The clips are generally equally spaced with respect to each other since this is the most economical manner of forming the clips integral with the wire reinforcing member and of embedding the reinforcing member in the sealing strip when the sealing strip is molded.

However, in many instances the contours of the supporting member are such as to require a closer spacing of the clips in certain areas in order that the elongate side of the sealing strip may continuously engage the member without bulging of the strip intermediate the clips. This is particularly true wherein the contours of the supporting member include areas of sharp curvature or curvature in more than one plane.

It is not economically feasible to provide special machinery for spacing the clips closer together in certain areas of the reinforcing member and to also provide special machinery for molding the reinforcing member having unequally spaced clips with the sealing strip.

This invention provides a weather strip assembly which may be secured to any supporting member regardless of the contour thereof and regardless of the spacing of the attaching means required in any area to adequately and firmly mount the weather strip on the member. This is accomplished by providing individual attaching clips which may be easily secured to the weather strip assembly at any desired location thereon to provide any spacing of the clips desired and necessary in any area to firmly and adequately secure the assembly to the supporting member. When the individual clips are in assembled relationship with the weather strip assembly, the clips project from the same elongate side of the weather strip assembly as the integral clips of the reinforcing member. In addition, the clips may be easily disassembled from the weather strip assembly whenever necessary without injury to the material of the sealing strip and may be easily repositioned in any other desired location.

In certain instances it may be desirable to dispense with the integral clips of the reinforcing member and to merely mold a reinforcing member without clips into the sealing strip. In such instances the clips of this invention may be assembled with the reinforcing member to provide the necessary attaching means of the assembly on the supporting member. Thus, it will be apparent that the weather strip assembly of this invention has many varied uses in conjunction with the sealing of closures and solves many of the problems attendant with the sealing of closures on vehicle bodies or the like.

The primary object of this invention is to provide a new and improved weather strip assembly.

This and other objects of this invention will be readily apparent from the following specification and drawings, in which:

Figure 1 is a partial view of a vehicle body having a weather strip assembly according to this invention mounted thereon:

Figure 2 is an enlarged view of a portion of Figure 1;

Figure 3 is a view of the reinforcing member removed from the weather strip assembly;

Figure 4 is an enlarged view of a portion of Figure 2 showing one of the individual attaching clips assembled with the reinforcing member and showing the weather strip in outline;

Figure 5 is a view taken on the plane indicated by line 5—5 of Figure 4; and

Figure 6 is a view taken on the plane indicated by line 6—6 of Figure 4.

Referring now particularly to Figure 1 of the drawings, a vehicle body 10 includes a rear deck lid 12 which is swingably mounted on the body by suitable hinges 14 for movement between an open position, as shown, and a closed position wherein the deck lid closes the opening 16 of a rear luggage compartment 18. When the deck lid is in closed position, it is sealed by a weather strip assembly 20, which is mounted on the body immediately adjacent opening 16 and which may be continuous as shown or discontinuous.

As can be seen in Figure 2, the rear upper wall 22 of the body which defines opening 16 includes flanged portions 24 and 26 and an upwardly opening terminal channel 28 which receives an elongate sealing strip 30 of molded resilient compressible material. The sealing strip may be made of sponge or foam rubber, with or without an outer non-cellular continuous thin skin or may be made of non-cellular rubber. The sealing strip 30 is provided with a sinuous wire reinforcing member 32, Figure 3, which is embedded therein and molded therewith. A number of equally spaced aligned clips 34 are integral with member 32 and project substantially normal from an elongate side 36 of the sealing strip to provide a means of attaching the strip to the base wall 38 of channel 28. The sinuous wire member 32 is flat so as to lie in a plane substantially parallel to the plane of the elongate side 36 of the sealing strip, and the integral clips 34 of the reinforcing member project substantially normal to side 36 of strip 30 although this need not be necessary in all instances.

Each of the clips 34 is of closed loop formation and includes arcuate legs 40 which are joined at one end to member 32 and are joined together on a curved junction remote from member 32. The intermediate portions 41 of the legs have a width greater than the diameter of the opening 42 in the base wall 38. To attach the weather strip assembly to the body the assembly is fitted within channel 28 and the clips are pushed through the openings 42 to press the intermediate portions 41 of legs 40 toward each other and then allow them to expand when they have passed through the openings to draw the elongate side 36 of the weather strip into firm engagement with the upper surface of wall 38. As will be noted, the clips 34 are equally spaced with respect to each other since this is the most economical manner of forming the wire reinforcing member and of also molding the member with the material of the sealing strip.

It is very often desirable and necessary to provide additional attaching clips intermediate the integral clips of the reinforcing member in order to provide a closer spacing of the clips in certain areas. This requirement of additional clips is very often necessary when the wall is of curved contour or includes curved contours in more than one plane in order to prevent bulging of the weather strip intermediate clips 34. In the past, this problem has remained unsolved since it was not economically feasible to make wire reinforcing members having unequally spaced clips and mold such members with the sealing strip to provide a special weather strip assembly for each particular condition requiring the unequal spacing of the clips. However, this invention solves this problem by providing one or more like individual clips 44 which may be attached to the weather strip assembly at any desired point thereon and may also be easily removed from the assembly without tearing or rupture of the material of the sealing strip. The clips 44 project through opening 45 in wall 38 in the same manner as clips 34 and the mounting of the assembly 20 within channel 28 is also the same.

Referring now particular to Figures 4, 5, and 6 of the drawings, it will be noted that each clip is formed of a single piece of wire which may be of the same diameter as the wire of the reinforcing element or of either greater or less diameter. Each clip 44 includes a loop 46 having legs 48 of substantially the same configuration as the legs 40 of clips 34 and a generally U-shaped leg 50 joined to each leg 48 of loop 46 by a laterally extending juncture portion 52. The loop 46 and juncture portions 52 lie in the same plane while the U-shaped legs 50 lie generally in planes normal to the plane containing the loop and the juncture portions. The free end of each of the legs 50 is beveled on one side thereof to provide a sharp pointed end 54.

When the individual clips 44 are in assembled relationship with the weather strip assembly, the sinuous wire reinforcing member 32 is received within the legs 50, with the upper or free sides 55 thereof overlying and in engagement with the member 32 and the lower sides 57 thereof in engagement with the side 36 of strip 30 so that the loops 44 project from the elongate side 36 of the strip 30 in substantially normal relationship thereto. The distance between the upper and lower sides 55 and 57 of each leg 50 is less than the distance between wire member 32 and the elongate side 36 of the sealing strip so that the portion of the sealing strip between member 32 and side 36 will be compressed by the clip when it is assembled with the weather strip assembly to insure that the clip will remain in place. It will be noted that side 36 of the sealing strip is depressed in the area of engagement of the strip with the juncture portions 52 and the lower sides 57 of the legs of the clip so that portions 52 and sides 57 will be located below the surface of side 36. Thus, there will be no engagement between portions 52 and sides 57 of the clip and the surface of wall 38 when the weather strip assembly is assembled on the supporting member and side 36 of the sealing strip will continuously engage wall 38 even in the area of the clip 44 to provide a seal between side 36 and the wall.

It will also be noted that each leg 50 overlies and engages an oppositely opening loop of member 32 since the spacing of the legs is approximately equal to one half of a loop of the member. This insures an adequate support for the clip 44 on member 32 since it provides two points of engagement staggered widthwise of strip 30. To insure that loops 46 will be aligned with clips 34, the lower side 57 of each leg 50 is of a length substantially equal to one half the widthwise distance of member 32. Thus, clips 34 and loops 46 will be aligned and will lie in a plane containing the longitudinal axis of symmetry of member 32 and normal to the plane of the element.

When it is desired to assemble the clips 44 with the weather strip assembly, the sharp pointed ends 54 of legs 50 are placed against side 16 of the weather strip at approximately 60 with the juncture portions 52 of the clip held in engagement with side 36. Then the legs are pushed inwardly through the material of the weather strip and turned with respect to side 36 until the upper or free sides 55 of the legs overlie the wire reinforcing member 32 and are in engagement therewith and the lower sides 55 of the clips and juncture portions 52 are in engagement with the side 36 and slightly depress side 36 in their areas of engagement. By carefully guiding the legs through the material of the sealing strip, the strip is not torn or ruptured. Since the material of the weather strip is resilient and compressible the material will engage the legs of the clip in sealing engagement therewith to prevent entry of moisture or other foreign matter within the sealing strip which might damage the strip or the wire reinforcing member.

When it is desired to disassemble the clips from the weather strip assembly, the reverse procedure takes place and any openings in the lower wall 36 of the weather strip will be easily sealed by the resilient and compressible material of the sealing strip.

As previously mentioned, the wire reinforcing member 32 need not be provided with any integral loops 34 in certain instances and the attaching means may be formed solely by the individual clips 44.

Thus, this invention provides a weather strip assembly which may be universally used for sealing opposed elongate surfaces regardless of the contours of the surface of the member which supports the weather strip assembly. The clips may be used with equal success on all types of weather strips whether of the cross sectional configuration shown in the drawings or of other cross sectional configuration. The weather strip assembly also need not be received within a channel on the body or closure member for the assembly of this invention is equally applicable to planar supporting walls or members.

While a specific embodiment of this invention has been shown and described, various changes and modifications may be made within the scope and spirit of the invention.

I claim:

A weather strip assembly comprising, an elongate sealing strip of resilient compressible material, a sinuous wire member embedded within and completely enclosed by said strip and located adjacent an elongate side thereof, the sinuous parts of said wire being in a single plane parallel to the said elongate side, said member including integral fastener parts equally spaced along the elongate side and projecting therefrom substantially perpendicularly to the plane of the said sinuous parts, individual wire fastener parts removably secured to said sealing strip intermediate said integral fastener parts, the said individual wire fastener parts having an attaching head portion and two U-shaped portions, the said U-shaped portions lying in spaced parallel planes substantially perpendicular to the plane of the said sinuous wire member, one leg of each of said U-shaped portions overlying and adjacent the said sinuous wire member, the other leg of each of said U-shaped portions lying in a plane parallel to the said elongate side and between the said elongate side and the said sinuous wire member, the sealing strip below the said sinuous wire and in the plane of said U-shaped portions being compressed between the said sinuous wire and the said other legs, and the said head portion being integral with each of said other legs and projecting substantially perpendicularly from the plane of said elongate side.

References Cited in the file of this patent

UNITED STATES PATENTS

| | | |
|---|---|---|
| 1,992,092 | Place | Feb. 19, 1935 |
| 2,136,981 | Place | Nov. 15, 1938 |
| 2,579,072 | Harris | Dec. 18, 1951 |
| 2,612,665 | Scott | Oct. 7, 1952 |
| 2,740,179 | Flora | Apr. 3, 1956 |
| 2,787,033 | Peckham et al. | Apr. 2, 1957 |